(12) United States Patent
Hu et al.

(10) Patent No.: US 10,298,437 B2
(45) Date of Patent: May 21, 2019

(54) DISTRIBUTED DATA COLLECTION IN AN ENTERPRISE NETWORK

(71) Applicant: QUEST SOFTWARE INC., Aliso Viejo, CA (US)

(72) Inventors: GuangNing Hu, Kanata (CA); Jason Aylesworth, Nepean (CA)

(73) Assignee: QUEST SOFTWARE INC., Aliso Viejo, CA (US)

( * ) Notice: Subject to any disclaimer, the term of this patent is extended or adjusted under 35 U.S.C. 154(b) by 242 days.

(21) Appl. No.: 15/256,853

(22) Filed: Sep. 6, 2016

(65) Prior Publication Data

US 2018/0069748 A1    Mar. 8, 2018

(51) Int. Cl.
*H04L 12/28* (2006.01)
*H04L 12/24* (2006.01)
*H04L 12/18* (2006.01)
*G06F 15/173* (2006.01)

(52) U.S. Cl.
CPC ........ *H04L 41/046* (2013.01); *H04L 12/1822* (2013.01)

(58) Field of Classification Search
USPC ........................................................ 709/224
See application file for complete search history.

(56) References Cited

U.S. PATENT DOCUMENTS

| | | | | |
|---|---|---|---|---|
| 6,119,052 A * | 9/2000 | Guenther | ............... | B65H 5/228 271/194 |
| 6,529,934 B1 * | 3/2003 | Kawamura | ........... | G06F 9/4875 709/202 |
| 7,693,983 B1 * | 4/2010 | Gupta | ................. | H04L 12/1471 709/221 |
| 8,307,128 B2 * | 11/2012 | Forrer, Jr. | ............... | G06F 3/061 710/2 |
| 2002/0087473 A1 * | 7/2002 | Harif | .................... | G06Q 20/382 705/44 |
| 2002/0087481 A1 * | 7/2002 | Harif | ..................... | G06Q 20/02 705/74 |
| 2002/0087483 A1 * | 7/2002 | Harif | ..................... | G06Q 20/02 705/76 |
| 2002/0087613 A1 * | 7/2002 | Harif | ..................... | G06Q 30/02 718/104 |
| 2002/0087881 A1 * | 7/2002 | Harif | ..................... | H04L 63/08 726/1 |
| 2003/0018539 A1 * | 1/2003 | La Poutre | ............ | G06Q 10/087 705/26.1 |
| 2003/0163410 A1 * | 8/2003 | Byde | ...................... | G06Q 30/08 705/37 |
| 2004/0125806 A1 * | 7/2004 | Barzilai | ................. | H04L 29/06 370/395.21 |

(Continued)

*Primary Examiner* — Jude Jean Gilles
(74) *Attorney, Agent, or Firm* — Maschoff Brennan

(57) ABSTRACT

In some implementations a starter task to gather data associated with at least a portion of a communications system may be received. A plurality of targets associated with the starter task may be determined. A portion of the plurality of targets may be grouped, based on grouping criteria, to create a collection task. A plurality of bids may be received from a plurality of collection agents, where each bid of the plurality of bids includes a cost estimate to perform the collection task. A winning bid of the plurality of bids may be selected. A particular collection agent associated with the winning bid may perform the collection task.

20 Claims, 6 Drawing Sheets

(56) References Cited

U.S. PATENT DOCUMENTS

2006/0034284 A1* 2/2006 Saklecha ............... H04L 49/254
  370/392
2009/0141628 A1* 6/2009 Barzilai ................. H04L 47/10
  370/230.1
2009/0259749 A1* 10/2009 Barrett ................ G06F 11/3495
  709/224
2017/0310608 A1* 10/2017 Kulick ................... H04L 47/82

* cited by examiner

DISTRIBUTED DATA COLLECTION IN AN ENTERPRISE NETWORK

BACKGROUND OF THE INVENTION

Field of the Invention

This invention relates generally to gathering data and, more particularly, to gathering communication data in an enterprise using distributed collectors.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A company ("enterprise") may use software to manage the use of different types of communications (e.g., email, video conferencing, collaboration suite, productivity suite, and the like). An enterprise may use software, such as Dell® Unified Communications Command Suite (UCCS) or the like, to manage communication applications, such as, for example, Microsoft® Exchange® (e.g., email), Skype for Business (e.g., videoconferencing, audio conferencing, instant messaging, screen sharing, or the like), Microsoft® Office (e.g., document creation and management), Cisco® Unified Communications Manager (e.g., collaboration suite), and the like. Typically, such software uses a centralized system architecture in which a system administrator configures various services (e.g., to collect, store, and query data associated with the use of communication applications) during the initial deployment of the software.

Such an architecture may work for small enterprises or large centralized organizations. However, a centralized system architecture in which services are configured during the deployment of the management software may not be well suited for large enterprises with distributed communication deployments. For example, the service configurations created during deployment may not be ideal when enterprise network conditions vary, particularly in a distributed environment that includes multiple data centers, servers, and devices distributed across multiple countries, and using a variety of network devices supporting different bandwidths. As another example, the software may encounter difficulties when attempting to gather data from different entities at periodic intervals (e.g., once a day), to provide a snapshot of the environment. As a further example, when server maintenance is being performed, performing data collection may cause the in-service servers to become overloaded, resulting in collection delays or denial of access to the servers. In addition, to minimize the impact to business activities, the software should take into account the business requirements for critical resources when performing data collection. Thus, a centralized system architecture in which a system administrator configures services to collect, store, and query data associated with the use of communication applications during the initial deployment of the software may not be suited for large enterprises with distributed communication deployments.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

A starter task to gather data associated with at least a portion of a communications system may be received. A plurality of targets associated with the starter task may be determined. A portion of the plurality of targets may be grouped, based on grouping criteria, to create a collection task. A plurality of bids may be received from a plurality of collection agents, where each bid of the plurality of bids includes a cost estimate to perform the collection task. For example, the bid may be a numerical representation of an amount of resources (e.g., time, processing resources, bandwidth, and the like) that an agent is estimated to consume to perform the task. A winning bid of the plurality of bids may be selected. A particular collection agent associated with the winning bid may perform the collection task.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
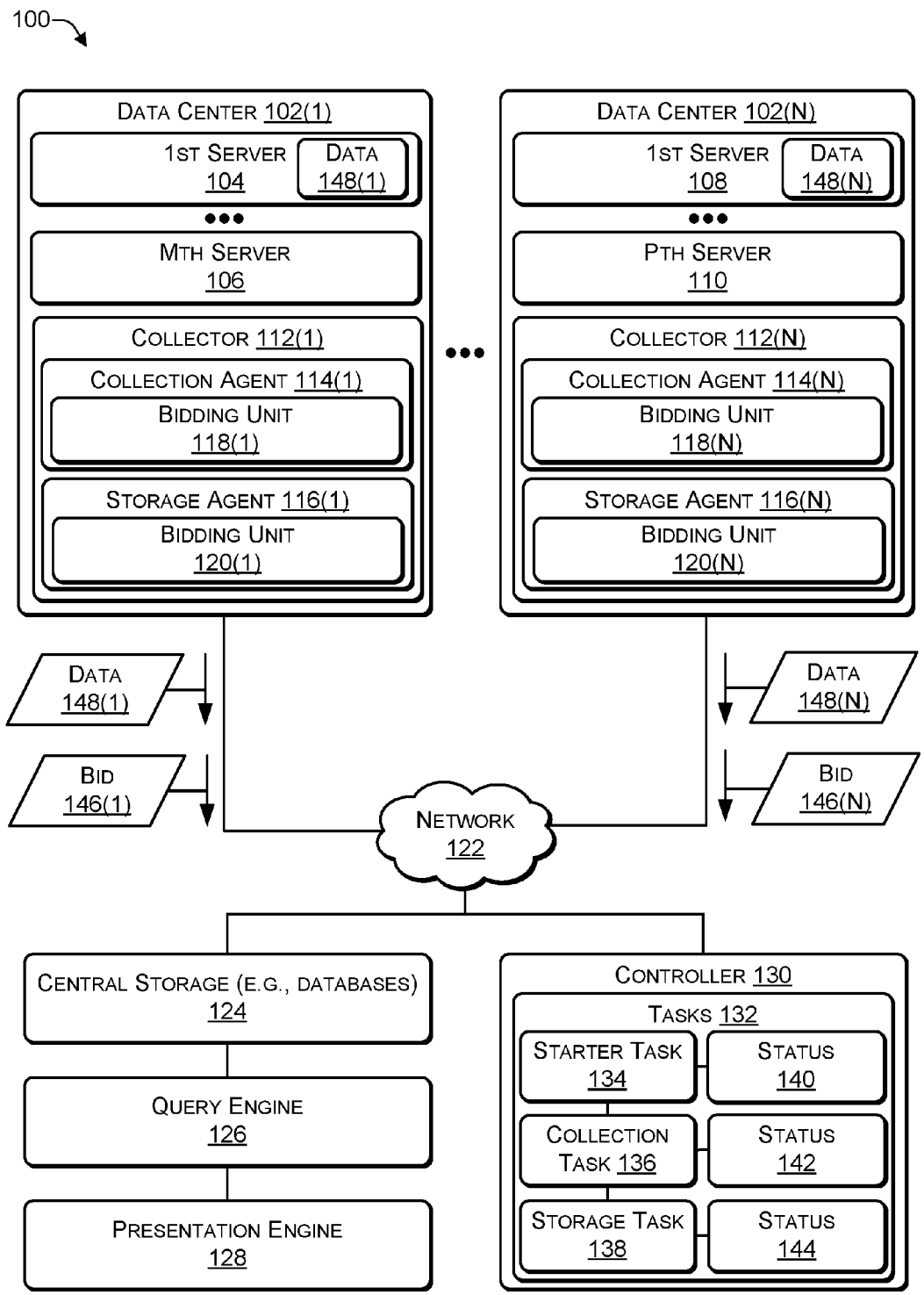
FIG. 1 is a block diagram of an architecture that include a distributed communications system with distributed adaptive collectors according to some embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein may be used to adaptively collect data (e.g., usage data) associated with communications systems in an enterprise. For example, data collection agents and data storage agents may be deployed by distributing the agents in multiple locations across an enterprise network. The agents may adapt to the enterprise network as conditions in the enterprise network change.

Multiple data collectors, where each data collector includes (1) one or more data collection agents and (2) one or more data storage agents, may be deployed in different locations within the enterprise network. Each data collector may be installed as a single module on any server in any data center in the enterprise network. Additional data collectors may be installed as the enterprise network grows and evolves. Each agent includes information on how to work with (e.g., how to gather data from) components (e.g., email server, videoconferencing server, collaboration suite server, productivity suite server, and the like) in the enterprise network and how to work with other agents to dynamically share the data collection workload. For example, the agents may adapt to conditions in the enterprise network by coordinating with other agents to gather and store data using a bidding system in which agents bid on jobs (e.g., data collection jobs and data storage jobs). The bidding system may enable the agents to adaptively manage the data gathering by dynamically distributing different portions of the workload among the agents. When an agent submits a bid, the bid may be a numerical representation of an amount of resources (e.g., time, processing resources, bandwidth, and the like) that the agent is estimated to consume to perform the task. For example, the bid may take into account one or more of (1) an amount of time that the agent is estimated to take to perform the task, (2) a number of central processing unit (CPU) cycles the agent is estimated to use to perform the task, (3) an amount of main memory (e.g., random access memory (RAM) the agent is estimated to use to perform the task, (4) an amount of temporary storage (e.g., disk storage) the agent is estimated to use to perform the task, (5) an amount of bandwidth the agent is estimated to use to perform the task, or (6) an amount of another resource the agent is estimated to use to perform the task. In some cases, the bid may be a raw number while in other cases the bid may be scaled (e.g., between 0 and 10, between 0 and 100) etc. A lower bid may be selected over a higher bid as the winning bid because the agent with the lower bid consumes fewer resources to perform the task than the agent with the higher bid. To illustrate, the agent with a lower bid may be able to perform the task faster and/or cheaper than an agent with a higher bid.

A central controller may enable centralized management of the agents that have been distributed across an enterprise network. The agents may gather communications usage data and then store the data in a central storage facility (e.g., in an Active Directory, a file share, or the like). For each data collection job (e.g., gathering usage data for a particular type of communications system in a particular country), the central controller may create multiple smaller tasks. For example, each task created by the central controller may be one of three type of tasks: (1) a starter task, (2) a collection task, or (3) a storage task. The data collection agents and the data storage agents from different data collectors may bid on performing each of the tasks.

When a new data collection job is created, the central controller creates a starter task. The starter task (i) identifies the job (e.g., task) to be performed and (ii) identifies the job targets (e.g., identify the locations from which data is to be gathered). As the job targets are being identified, the starter task (i) groups the job targets into batches based on the target's configuration and (ii) creates a new collection task for each batch. Each collection tasks that is created is placed in the central controller and the data collection agents bid to perform the individual collection task. For example, a starter task may be created to collect email (e.g., Exchange®) statistics for X (e.g., 20,000) mailboxes in an enterprise. The starter job is used to identify the mailboxes from which data is to be collected. When the number of mailboxes satisfy a threshold, e.g., a pre-determined number Y (e.g., 200) of mailboxes have been identified or Y mailboxes that share a common feature (e.g., co-located on the same server) have been identified, the starter task creates a new collection task to collect mailbox statistics for the Y mailboxes. The starter task places the new collection task in the central controller to enable bidding. Two or more data collection agents may bid on the collection task. The collection task may be awarded to (and executed by) the data collection agent that satisfies particular bidding criteria. The bidding criteria to determine the winning bid may be either the lowest bid or the highest bid, depending on how the bidding is calculated. While the remainder of the examples herein use the lowest bid (e.g., lowest cost bid) as the winning bid, it should be understood that the systems and techniques described herein may be used in a system in which the highest bid is considered the winning bid. The starter task may continue to identify additional mailboxes and create additional collection tasks (upon which the data collection services bid) until all of the X mailboxes have been identified and grouped into collection tasks. At the same time that the starter task is continuing to create the additional collection tasks, the data collection agents may bid on individual collection tasks as the individual collection tasks are created.

After bids from multiple data collection agents have been received for a collection task, the execution rights to the collection task are awarded to a particular data collection agent that satisfies pre-determined bidding criteria (e.g., lowest cost bid). After the bidding process for the collection task is complete (e.g., the collection task has been awarded to an agent), the particular data collection agent may connect to one or more servers in the enterprise network to collect the information associated with the collection task. After the data collection agent has completed the collection task, the data collection agent may update the status of the collection task in the central controller to indicate that the data collection task has been completed.

The data collection agent may create a new storage task (e.g., to store the collected data) in the central controller. The new storage task may be created after a data collection agent has started a collection task. Two or more of the data storage agents that are located in the enterprise network may bid on the right to perform the storage task. The data storage agent that satisfies pre-determined bidding criteria (e.g., lowest cost bid) may be awarded the storage task for execution. After a data storage agent is awarded the execution rights to a storage task, the data storage agent may communicate with the data collection agent that created the storage task to begin the process of storing the collected data in a central storage location (e.g., storage databases). In some cases, the data storage agent may store the collected data after the data collection agent has completed the collection task. In other cases, the data collection agent may collect data while, substantially at the same time (e.g., in parallel), the data storage agent stores the collected data. After the data storage agent has completed the storage task, the data storage agent may update the status of the storage task in the controller to indicate that the storage task has been completed. The data storage agent may mark the data collection job as completed after the start task, the associated collection tasks, and the associated storage tasks have been completed.

When an agent (e.g., a data collection agent or a data storage agent) submits a bid to execute a task (e.g., a data collection task or a data storage task), a bidding unit associated with the agent may create the bid. The bidding unit may take into account various factors when creating the bid, such as, for example, real-time cost analysis, a configuration analysis, a historical cost analysis, a server status analysis, previous execution results, other types of data related to the service or the bid, or any combination thereof. The configuration cost analysis may perform an analysis of configuration data (e.g., data associated with how a communications system, from which data is to be collected, is configured). The historical cost analysis may analyze historical information related to the results of executing similar tasks. The real-time cost analysis may analyze the performance of one or more recently completed tasks substantially in real-time. The server status analysis may analyze server performance (e.g., central processing unit (CPU) usage, memory usage, input/output (I/O) throughput, network traffic throughput, and the like) including performance related to critical resources from target servers, at a specified interval. Thus, the bidding process is adaptive because the bid takes into account various factors, such as the performance of the network, the performance of the server, and current and past performance of the agent.

Thus, to capture data associated with the usage of multiple communications systems (e.g., email, videoconferencing, audio conferencing, instant messaging, screen sharing, collaboration suite, productivity suite, and the like) in an enterprise network, two types of software agents, e.g., collection agents and storage agents, may be deployed in the enterprise network. A starter task that broadly defines the task (e.g., collect data associated with communications system X in location Y) may be created. The starter task may be used to identify sub-tasks (e.g., targets). The sub-tasks may be grouped into collection tasks based on one more criteria (e.g., group based on location of mailboxes, location of conferencing servers, location of owners of accounts, number of mailboxes, or the like). Each collection task may be bid upon by multiple collection agents that are deployed in the enterprise network. The collection agent with the lowest bid for a particular collection task may be awarded the collection task. The collection agent may execute the collection task to collect data. After the data has been collected, the collection agent may create a storage task to store the collected data. The collection agent may update the status of the collection to indicate that the collection task has been completed. Multiple storage agent (e.g., agents) may bid on the storage task, with the storage task awarded to the storage agent with the lowest bid. The storage agent may gather the collected data from the collection agent and store the collected data in a central storage facility (e.g., a database). After completing the task, the storage agent may change the status of the collection task to indicate that the collection task has been completed. When the storage agent determines that the collection tasks and storage tasks associated with a starter task have been completed, the storage agent may change the status of the starter task to completed. Thus, by taking various factors, including network performance, server performance, and agent performance, into account, the bids may adapt to changing network conditions, thereby providing a dynamic and adaptive process for completing the tasks.

FIG. 1 is a block diagram of an architecture 100 that includes a distributed communications system with distributed adaptive collectors according to some embodiments. The architecture 100 includes multiple data centers 102(1) to 102(N) (where N>1). In some cases, the data centers 102 may be located in different locations. For example, the data center 102(1) may be located in a first location and the data center 102(N) may be located in a second location that is different from the first location.

Each data center 102 may include one or more servers associated with communication systems (e.g., email, productivity suites, videoconferencing, audio conferencing, instant messaging, screen sharing, collaboration suites, and the like). For example, the data center 102(1) may include a first server 104 to an Mth server 106 (where M>1) and the data center 102(N) may include a first server 108 to a Pth server 110 (where P>1, P not necessarily equal to M and N). To illustrate, the servers 104, 106, 108, 110 may individually host various communication systems, such as email systems (e.g., Microsoft® Exchange®), productivity suites (e.g., Microsoft® Office), videoconferencing (e.g., Skype® for Business), collaboration suites (e.g., Cisco® Unified Communications Manager), and the like. At least one collector 112 may be installed in each data center 102. For example, a collector 112(1) may be installed in the data center 102(1) and a collector 112(N) may be installed in the data center 102(N).

Each collector 112 may include at least one collection agent 114 and at least one storage agent 116. For example, the representative collector 112(1) may include a representative collection agent 114(1) and a representative storage agent 116(1) and the representative collector 112(1) may include a representative collection agent 114(1) and a representative storage agent 116(1). While each collector 112 in FIG. 1 is shown as including one collection agent 114 and one storage agent 116, depending on the implementation, each collector 112 may include more than one collection agent 114 and more than one storage agent 116. Each of the collection agents 114 may be capable of performing a data collection service to gather data associated with a communication system in an enterprise network. Each of the storage agents 116 may be capable of providing a data storage service to transfer and store previously gathered data in a central storage location.

Each of the agents 114, 116 may include a bidding unit. For example, the collection agent 114(1) may include a bidding unit 118(1), the collection agent 114(N) may include a bidding unit 118(N), the storage agent 116(1) may include a bidding unit 120(1), and the storage agent 116(N) may include a bidding unit 120(N). The bidding units 118, 120 may be used by the individual agents 114, 116 to bid on tasks (e.g., collection tasks or storage tasks). The operation of the bidding unit is described in more detail in FIG. 2.

Each of the data centers 102 may be communicatively coupled to other data centers and to other network components via a network 122. The network 122 may include wired and wireless technologies, such as, for example, Ethernet, Data Over Cable Service Interface Specification (DOCSIS), fiber optic cable, WiFi®, Bluetooth®, code division multiple access (CDMA), global system for mobile (GSM), and the like.

The storage agents 116 may store data gathered by the collection agents 114 in a central storage 124. For example, the central storage 124 may include one or more databases. A query engine 126 may provide a graphical user interface (GUI) or other type of interface to enable one or more users (e.g., a system administrator) to submit a query to the central storage 124 and receive search results in response to the query. The search results may be displayed on a display device or printed on a printer via a presentation engine 128. For example, a user may query various portions of the communication systems (e.g., particular locations) to identify which portions are under-utilized, which portions are over-utilized, which portions need to be re-provisioned or re-configured, or the like. For example, if a query determines that an Exchange® server in a particular location (e.g., Denver) is at more than 90% capacity in terms of resource usage (e.g., one or more of processor usage, memory usage, storage usage, etc.) then the user may identify a solution to address the problem. For example, the solutions may include increasing server's resources, modifying the configuration (e.g., reducing an amount of storage allocated to each user), migrating Exchange® from a current server to a higher capacity server, or the like.

A controller 130 may centrally manage the operation of one or more of the collectors 112, the agents 114, 116, the central storage 124, the query engine 126, or the presentation engine 128. For example, the controller 130 may create a starter task 134 with an associated status 140. The controller 130 may use the starter task 134 to identify task targets (e.g., servers hosting electronic mailboxes) and group the task targets based on one or more criteria (e.g., number of mailboxes, location, or the like) to create sub-tasks, such as collection tasks. For example, the controller 130 may identify task targets until particular criteria have been satisfied to create a collection task 136 (e.g., a sub-task of the starter task 134). The controller 130 may set a status 142 associated with the collection task 136 to indicate that the collection task 136 is available to be bid upon by the collection agents 114. The controller 130 may receive multiple bids for a particular collection task, such as, for example, representative bids 146(1) to 146(N) from collection agents 114(1) to 114(N), respectively, for the collection task 136. The controller 130 may select one of the bids 146 that satisfies bid selection criteria (e.g., lowest bid) and modify the status 142 to indicate that the collection task 136 has been awarded to a particular one of the collection agents 114. In case of a tie between two or more bids, the controller 130 may use a tiebreak mechanism such as a round-robin selection, selecting a least recently used agent, or the like.

The controller 130 may award the collection task 136 to an agent from the collection agents 114 that has the winning (e.g., lowest) bid. For example, the controller 130 may instruct the collection agent 114(N), with the lowest bid among the collection agents 114, to initiate the collection task 136. In response, the collection agent 114(N) may initiate collection of the data by contacting the appropriate servers in the data center 102(N). The controller 130 or the collection agent 114(N) may create a storage task 138 (e.g., a sub-task of the starter task 134) to store the data gathered as a result of performing the collection task 136. The controller 130 or the collection agent 114(N) may set a status 144 of the storage task 138 to indicate that the storage task 138 is available to be bid upon by the storage agents 116. The controller 130 (or the collection agent 114(N)) may receive multiple bids for a particular storage task, such as, for example, one or more of the bids 146(1) to 146(N) from the storage agents 116(1) to 116(N), respectively, for the storage task 136. The controller 130 may select one of the bids 146 that satisfies bidding criteria (e.g., lowest bid) and modify the status 144 to indicate that the storage task 138 has been awarded to a particular one of the storage agents 116. In case of a tie between two or more bids, the controller 130 may use a tiebreak mechanism such as a round-robin selection, selecting a least recently used agent, or the like. After the collection task 136 has been completed, the controller 130 or the collection agent 114(N) may set the status 142 of the collection task 136 to completed.

The controller 130 may award the storage task 138 to an agent from the storage agents 116 that has the winning (e.g., lowest) bid. For example, the controller 130 may instruct the storage agent 116(N), having the lowest bid among the storage agents 116, to initiate the storage task 138. In response, the storage agent 116(N) may begin storing data, e.g., one or more of data 148(1) to 148(N), that was collected by the collection agent 114(N) when performing the collection task 136, in the central storage 124. After the storage task 138 has been completed, the controller 130 or the storage agent 116(N) may set the status 144 of the storage task 138 to completed.

In some cases, the storage task 138 may be created after the status 142 of the collection task 136 has been marked as completed. In other cases, the storage task 138 may be created after the status 142 of the collection task 136 has been marked as assigned to a particular collection agent 114 but before the status 142 has been marked as completed. For example, the collection agent 114(N) may collect the data 148(N) and, at substantially the same time (e.g., in parallel), the storage agent 116(N) may transfer the data 148(N) to the central storage 124.

When the starter task 134 is created, the controller 130 may identify the task targets associated with the starter task 134. For example, the task targets may include Exchange® mailboxes for email data, Exchange® tracking logs for email and Data Loss Prevention (DLP) events, Exchange® Internet Information Server (IIS) logs for ActiveSync events, Exchange® Servers (via PowerShell) for mailbox and server properties, Exchange® Servers (via PowerShell) for public folders, domain controllers (via lightweight directory access protocol (LDAP)) for users, groups & contacts, Skype® for Business structured query language (SQL) database for conference and peer-to-peer (P2P) activity, Skype® for Business SQL database for Quality of Experience metrics, Skype® for Business Server (via PowerShell) for configuration and user policies, Cisco® call data record (CDR) database for conference and P2P activity, Cisco® Servers (via a Representational state transfer (REST) application programming interface (API)) for configuration, Microsoft® Office 365 (via PowerShell) for user subscriptions, or the like.

The criteria used to group task targets together to create a task may vary based on the type of starter task and the type of target. The criteria is designed to create a relatively homogeneous set of targets in the collection task. Having a relatively homogeneous set of targets enables an agent to create a more accurate bid. One of the criteria used to group task targets may include determining that each task target involves a similar amount of work. For example, when collecting email data, target mailboxes may be grouped based on having a similar number of messages or a similar number of events in an activity log database. Another one of the criteria used to group task targets may include determining that each task target is affected by the same factors. For example, targets may be grouped together because the targets are located on the same server. In this way, information associated with multiple targets (e.g., mailboxes or the like) that are located on the same server can be retrieved using a single request rather than multiple requests, thereby reducing bandwidth usage. An additional one of the criteria used to group task targets may include an amount of effort associated with extracting data from each target. For example, task targets that have similar or the same operating conditions (e.g., task targets located on servers that have similar or the same amount of computing resources) may be grouped together in a task. A further one of the criteria used to group task targets may include determining whether grouping the targets reduces the number of underlying application programming interface (API) calls. For example, grouping certain mailboxes together may result in 1,000 messages from 1 mailbox, rather than 10 messages from each of 100 mailboxes. One of the criteria may include grouping targets to avoid interdependencies between two or more tasks. For example, some servers may throttle access on a per credential based. In this example, if two or more separate tasks run at substantially the same time and use the same credentials to access the same servers, the tasks could negatively impact each other due to access throttling. Grouping targets to avoid interdependencies between two or more tasks may reduce such access throttling.

In addition, for some portion (e.g., 10%, 5%, or the like) of the time, the winning bid that is selected may not be the lowest bid but instead may be the second lowest bid, the third lowest bid, or the like. In this way the estimated costs from different bidders may be validated. In addition, awarding bids in this manner enables non-intuitive configurations to be identified. Because the bids are merely estimates, selecting a low bid that is not the lowest bid may enable a wider number of agents to be awarded tasks as compared to if the lowest bid is always selected as the winning bid.

Thus, collection agents and storage agents may be dispersed across various locations in an enterprise network. When data associated with communications in an enterprise network is to be collected and stored, a starter task identifying the data to be collected at a high level is created. Based on the starter task, task targets that identify the type of data to be collected and the location of the data (e.g., servers that host the data) are identified. The task targets that are identified are grouped together, based on various criteria (e.g., number of task targets, location of task targets, and the like) to create collection tasks. Thus, one starter task may cause multiple sub-tasks, e.g., collection tasks, to be created. After a collection task has been created, multiple collection agents in the network each create and send a bid to perform the collection task. The collection task is awarded to a collection agent with the winning bid (e.g., lowest cost bid). A storage task is created to store, in a central location, the data collected from performing the collection task. Multiple storage agents in the network each create and send a bid to perform the storage task. The storage task is awarded to a storage agent with the winning bid (e.g., lowest cost bid). After each collection task or storage task has been completed, the status of the collection task or storage task is changed to completed. After the sub-tasks (e.g., the collection tasks and the storage tasks) associated with the starter task have been completed, the status of the starter task is marked as completed. The data stored in the central location may be queried and analyzed to identify potential problems and to address the potential problems before they impact the network and the users of the network.

Figure 2:
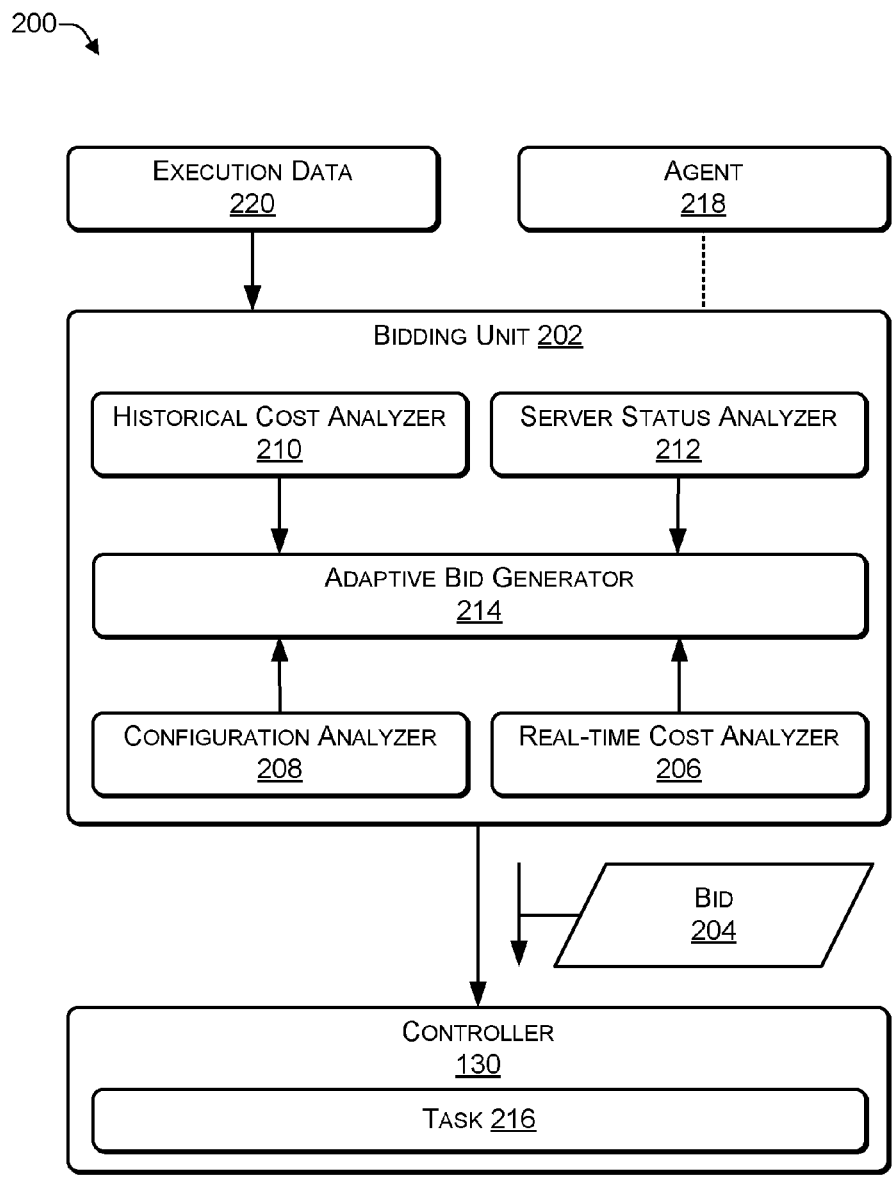
FIG. 2 is a block diagram of an architecture that includes a bidding service according to some embodiments.

FIG. 2 is a block diagram of an architecture 200 that includes a bidding service according to some embodiments. A bidding unit 202 (e.g., one of the bidding units 118, 120 of FIG. 1) may take into account various information when creating a bid 204 (e.g., one of the bids 146 of FIG. 1). For example, a real-time cost analyzer 206, a configuration analyzer 208, a historical cost analyzer 210, and a server status analyzer 212 may provide information to an adaptive bid generator 214. The adaptive bid generator 214 may use the information to provide a bid 204 to perform a task 216 (e.g., one of the tasks 136, 138 of FIG. 1).

The real-time cost analyzer 206 may perform an analysis of the performance of completed tasks in approximately real-time and provide the analysis to the adaptive bid generator 214. The configuration analyzer 208 may collect configuration data to enable the adaptive bid generator 214 to create a bid for the task 216. For example, the configuration analyzer 208 may determine target mailbox configurations and an Active Directory site communications link cost from the site of the target server to the site of the agent 218 to include the network topology when determining the bid 204. The historical cost analyzer 210 may store a history of execution results (e.g., results of performing tasks) and analyze the historical results to provide information to the adaptive bid generator 214 to create the bid 204. The server status analyzer 212 may monitor, at a predetermined interval (e.g., every hour, every 4 hours, every 12 hours, or the like), server performance and other resource usage from potential target servers. For example, resources, such as CPU usage, memory usage, disk I/O throughput, and network traffic may be monitored. The server status analyzer 212 may monitor software and application constraints related to target tasks, such as SQL user connections, web connections, throttling status for data collection accounts, and the like. The adaptive bid generator 214 may use information from the analyzers 206, 208, 210, and 212 to forecast an amount of time the agent 218 would take to perform the task 216 and submit the bid 204 for the agent 218 to perform the task 216. For example, the bid 204 may include the amount of time that the adaptive bid generator 214 has forecast that the agent 218 will take to perform the task 216.

The bidding unit 202 may be associated with an agent 218 (e.g., one of the agents 114, 116 of FIG. 1). If the bid 204 is determined to be the winning (e.g., lowest cost) bid, the agent 218 is awarded the execution rights to the task 216. The bidding unit 202 may monitor the performance of the agent 218 executing the task 216 to determine execution data 220. The execution data 220 may be used as input (e.g., to provide additional historical information) to the historical cost analyzer 210 and to the real-time cost analyzer 206. Using the execution data 220 (e.g., determined from performing the recent task 216) may enable the bidding unit 202 to provide adaptive bids. For example, if responses from an Exchange® server take longer at particular times of the day, bids generated during the particular times of the day may take this into account by increasing the bids. As another example, a network communication link that initially carried a relatively low amount of traffic may, over a period of time, carry more traffic, resulting in more latency for messages sent across the link. The bidding unit 202, over the same period of time, may take the latency into account by adjusting bids for task targets that are accessed using the network communication link.

During the bidding process, the agent that submits a low cost wins (e.g., is awarded) the execution rights to the task 216. The execution data 220 from performing the task 216 may be used to update the real-time cost analyzer 206 and the historical cost analyzer 210 for use when creating future bids. The execution data 220 from performing the task 216 may be provided to adaptive bid generator 214 for use when creating future bids. Thus, the adaptive bid generator 214 automatically adapts to changes in the enterprise network. The adaptive bid generator 214 may weigh the analysis received from each of the analyzers 206, 208, 210, and 212 to create the bid 204. After the adaptive bid generator 214 receives the execution data 220, the actual execution results may be compared with the original bid 204. If the execution data 220 differs significantly (e.g., more than a predetermined threshold) from the original bid 204, the adaptive bid generator 214 may adjust the weighting to reduce the discrepancy and increase the accuracy of subsequent bids.

For some portion (e.g., 10%, 5%, or the like) of the tasks, the winning bid that is selected may not be the lowest bid but instead may be the second lowest bid, the third lowest bid, or the like. Doing so enables validation of the estimated costs from different bidders and enables non-intuitive configurations to be identified. Because the bids are merely estimates, selecting a low bid (e.g., but not necessarily the lowest bid) enables a wider number of agents to be awarded tasks. In this way, agents that might not normally have the winning bid may be chosen to perform a task. For example, rather than selecting a first agent located in the same city (e.g., Austin, Texas, USA) as a server hosting multiple task targets, a second agent located far away (e.g., Bangalore, India) may be selected. Due to a fiber optic link between Austin and Bangalore that is underutilized at the time that the task is to be performed, the second agent in Bangalore may perform the task faster than the first agent located in Austin.

Thus, a bidding unit of an agent may take various factors into account to create a bid for the agent to perform a task. If the agent is awarded the task due to a winning bid, the execution of the task by the agent may be monitored and used to further fine-tune the bidding process.

Figure 3:
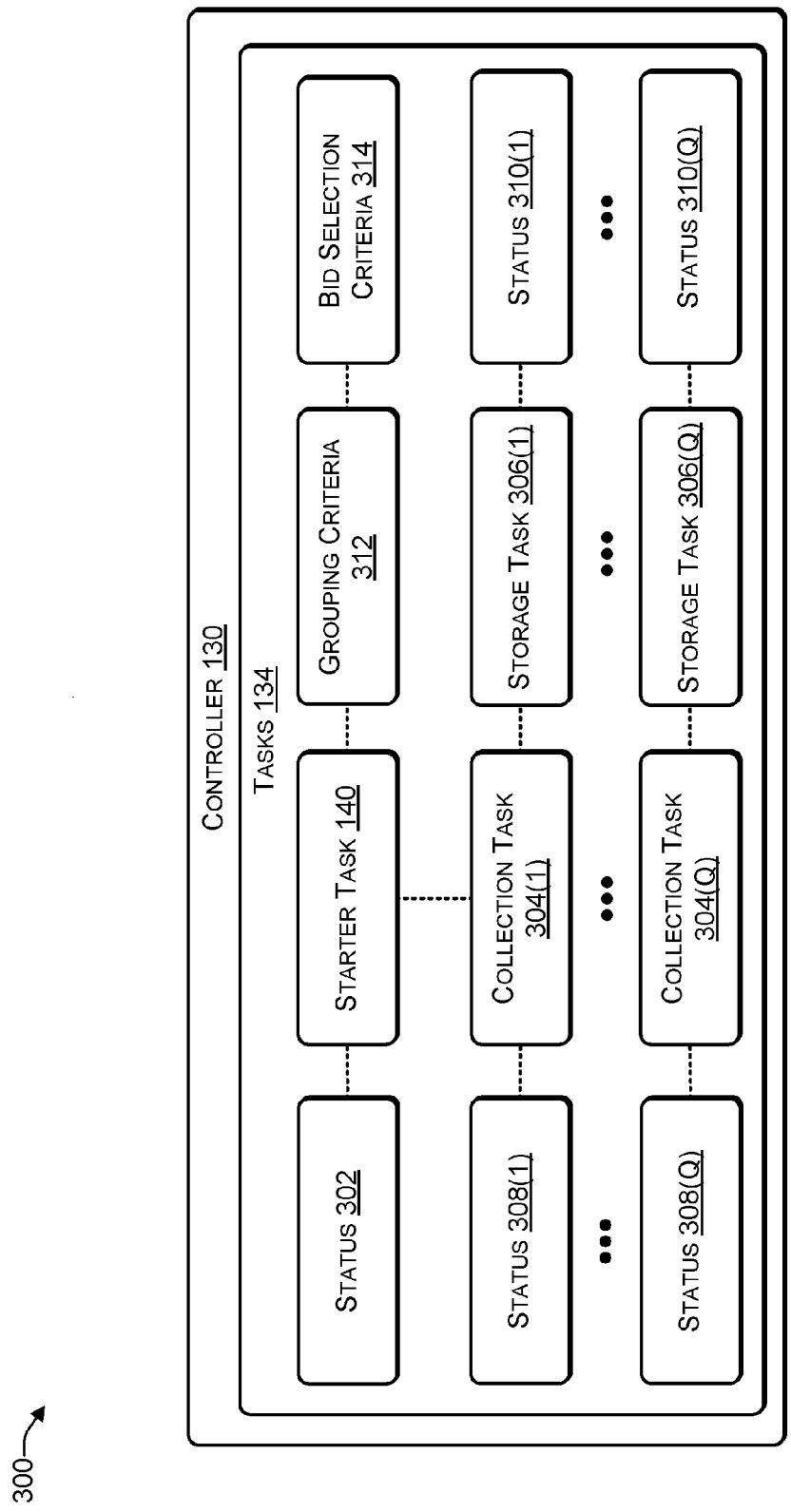
FIG. 3 is a block diagram of an architecture that includes tasks according to some embodiments.

FIG. 3 is a block diagram of an architecture 300 that includes tasks according to some embodiments. FIG. 3 illustrates the sub-tasks that may be created from a starter task and how the status of each task may change. In FIG. 3, the starter task 140 of FIG. 1 is used as an example.

The starter task 140 may have an associated status 302. The status 302 may initially be set to "processing" during the time that the controller 130 is identifying task targets and grouping the task targets into collection tasks 304(1) to 304(Q) (where Q>1). The status 302 is changed to "completed" after the status of the associated sub-tasks, e.g., the collection tasks 304 and storage tasks 306, have been changed to "completed".

Each of the collection tasks 304(1) to 304(Q) may have a corresponding status 308(1) to 308(Q). The storage tasks 306(1) to 306(Q) may be used to store the data collected by the corresponding collection tasks 304(1) to 304(Q). Each of the storage tasks 306(1) to 306(Q) may have a corresponding status 310(1) to 310(Q). When one of the tasks 304, 306 is created, the corresponding status 308, 310 may initially be set to "open to bidding" to solicit bids from agents. After a winning bid has been selected, the corresponding status 308, 310 may be changed to "agent selected". In some cases, a unique identifier (e.g., internet protocol (IP) address, process identifier, or the like) associated with the agent may be included in the status 308, 310, e.g., "agent ABC selected". After one of the tasks 304, 306 has been completed, the corresponding status 308, 310 may be changed to "completed". When all of the status 308, 310 are set to "completed", then the status 302 of the starter task 140 may be set to "completed".

When the controller 130 is identifying task targets associated with the starter task 140, the controller 130 may use grouping criteria 312 to group the task targets together into one of the collection tasks 304. The grouping criteria 312 are designed to create a relatively homogeneous set of targets in the collection task. Having a relatively homogeneous set of targets enables an agent to create a more accurate bid. The grouping criteria 312 may include determining that each task target involves a similar amount of work. For example, when collecting email data, target mailboxes may be grouped based on having a similar number of messages or a similar number of events in an activity log database. The grouping criteria 312 may include determining that each task target is affected by the same factors. For example, targets may be grouped together because the targets are located on the same server. In this way, information associated with multiple targets (e.g., mailboxes or the like) that are located on the same server can be retrieved using a single request rather than multiple requests, thereby reducing bandwidth usage. The grouping criteria 312 may include an amount of effort associated with extracting data from each target. For example, task targets that have similar or the same operating conditions (e.g., task targets located on servers that have similar or the same amount of computing resources) may be grouped together in a task. The grouping criteria 312 may include determining whether grouping the targets reduces the number of underlying application programming interface (API) calls. For example, grouping certain mailboxes together may result in 1,000 messages from 1 mailbox, rather than 10 messages from each of 100 mailboxes. The grouping criteria 312 may include grouping targets to avoid interdependencies between two or more tasks. For example, some servers may throttle access on a per credential based. In this example, if two or more separate tasks run at substantially the same time and use the same credentials to access the same servers, the tasks could negatively impact each other due to access throttling. Grouping targets to avoid interdependencies between two or more tasks may reduce such access throttling.

The controller 130 may use bid selection criteria 314 to select a winning bid from multiple bids associated with one of the tasks 304, 306. The bid selection criteria 314 may include selecting the lowest bid, selecting a low bid (but not necessarily the lowest bid), and the like. The bid selection criteria 314 may include tie break rules in the event that two or more agents have a potentially winning bid (e.g., lowest bid), e.g., selecting the agent who has not performed a task for the longest period of time. For example, if two agents submit the same lowest bid and a first agent performed a task one hour ago and a second agent performed another task six hours ago, then the second agent may be selected because the second agent has not performed a task for the longest period of time.

Figure 4:
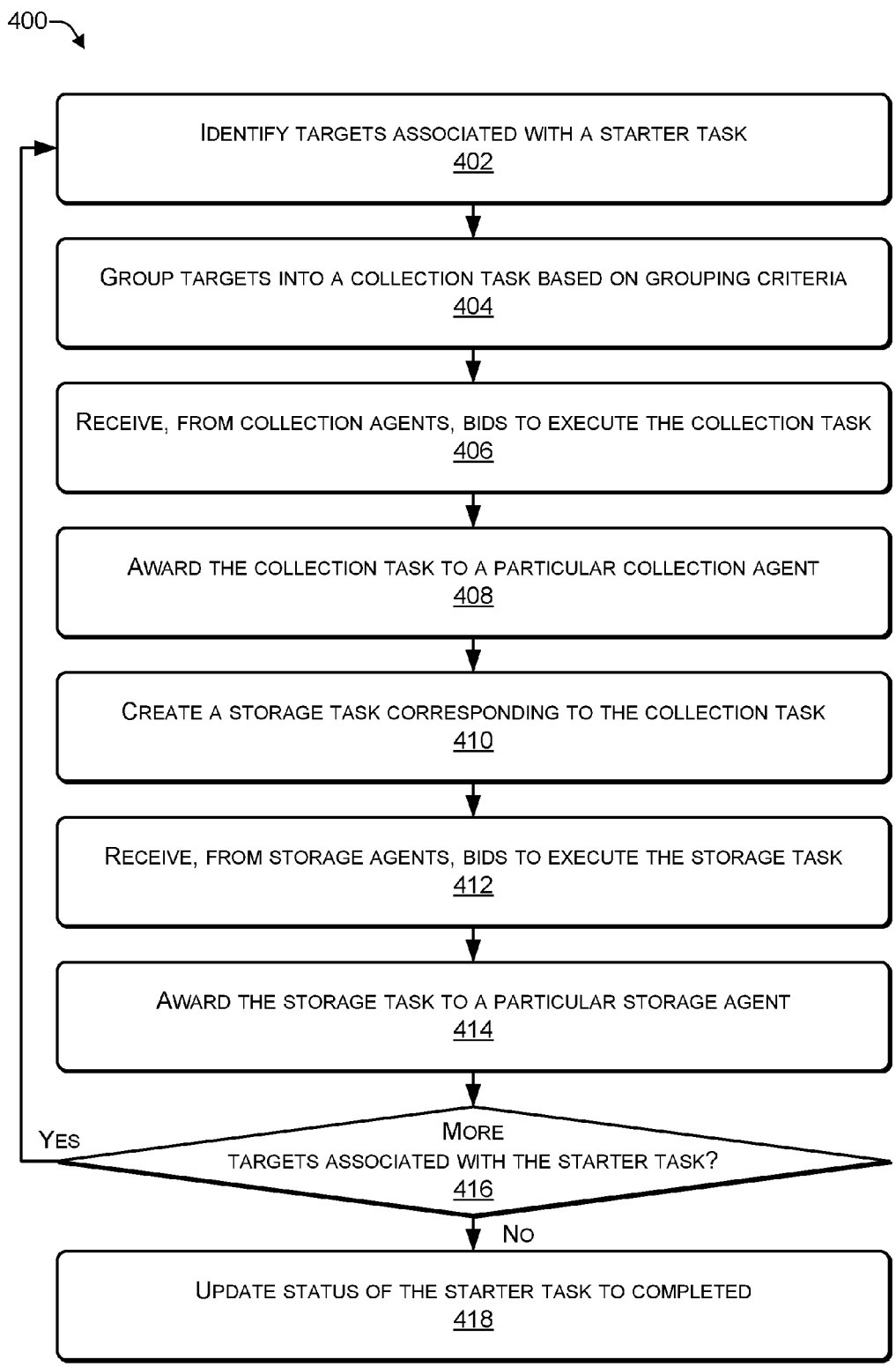
FIG. 4 is a flowchart of a process that includes identifying targets associated with a starter task according to some embodiments.
Figure 5:
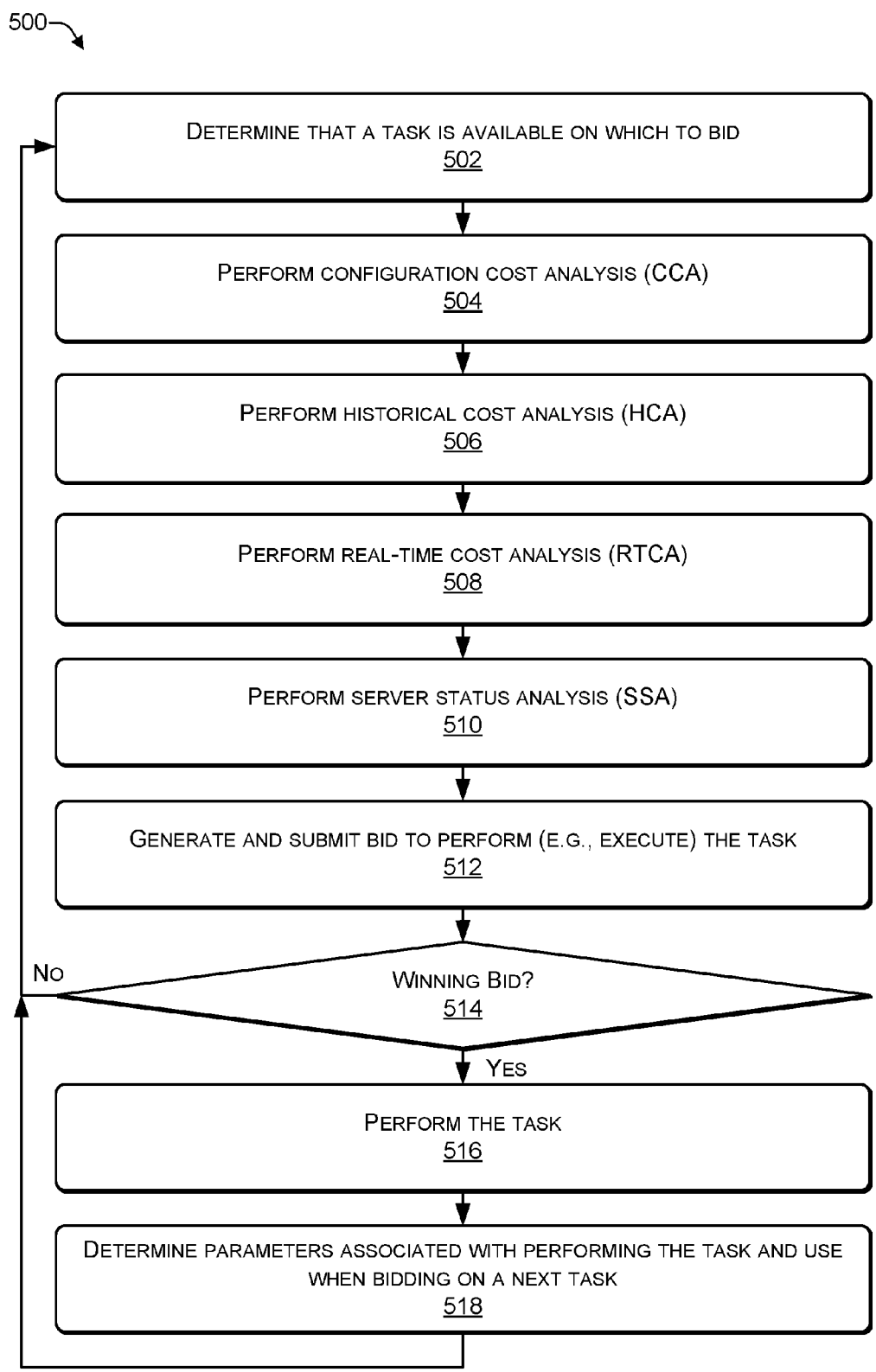
FIG. 5 is a flowchart of a process that includes generating and submitting a bid to perform a task according to some embodiments.

In the flow diagrams of FIGS. 4 and 5 each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 400 and 500 are described with reference to FIG. 1, 2, or 3 as described above, although other models, frameworks, systems and environments may be used to implement these processes.

FIG. 4 is a flowchart of a process 400 that includes identifying targets associated with a starter task according to some embodiments. The process 400 may be performed by the controller 130 of FIG. 1, FIG. 2, and FIG. 3.

At 402, targets associated with a starter task may be identified. At 404, the targets may be grouped, based on grouping criteria, into a collection task. For example, in FIG. 3, the targets associated with the starter task 140 may be identified and grouped together to create the collection tasks 304. For example, the task targets may include Exchange® mailboxes for email data, Exchange® tracking logs for email and Data Loss Prevention (DLP) events, Exchange® Internet Information Server (IIS) logs for ActiveSync events, Exchange® Servers (via PowerShell) for mailbox and server properties, Exchange® Servers (via PowerShell) for public folders, domain controllers (via lightweight directory access protocol (LDAP)) for users, groups & contacts, Skype® for Business structured query language (SQL) database for conference and peer-to-peer (P2P) activity, Skype® for Business SQL database for Quality of Experience metrics, Skype® for Business Server (via PowerShell) for configuration and user policies, Cisco® call data record (CDR) database for conference and P2P activity, Cisco® Servers (via a Representational state transfer (REST) application programming interface (API)) for configuration, Microsoft® Office 365 (via PowerShell) for user subscriptions, or the like.

At 406, multiple bids to execute the collection task may be received from multiple collection agents. At 408, the collection task may be awarded (e.g., based on bid selection criteria) to a particular collection agent of the multiple collection agents. For example, in FIG. 1, the collection task 136 may receive multiple bids 146 from the bidding units 118 associated with the collection agents 114. The controller 130 may use the bid selection criteria 314 to identify a winning bid (e.g., a low cost bid) and award the collection task 136 to a particular collection agent of the collection agents 114 that submitted the winning bid.

At 410, a storage task corresponding to the collection task may be created. At 412, multiple bids to execute the storage task may be received from multiple storage agents. At 414, the storage task may be awarded to a particular storage agent of the multiple storage agents. For example, in FIG. 1, For example, in FIG. 1, the storage task 138 to store the data collected by the collection task 136 may be created. The storage task 138 may receive multiple bids 146 from the bidding units 120 associated with the storage agents 116. The bid selection criteria 314 may be used to identify a winning bid (e.g., a low cost bid) and to award the storage task 138 to a particular storage agent of the storage agents 116 that submitted the winning bid.

At 416, a determination is made whether there are more targets associated with the starter task. If a determination is made, at 416, that "yes" there are more targets associated with the starter task then the process proceeds to 402, where additional targets associated with the starter task are identified. If a determination is made, at 416, that "no" there are no more targets associated with the starter task then the process proceeds to 418, where the status of the starter task is updated to "completed" after the sub-tasks, e.g., the collection tasks and the storage tasks associated with the starter task, have been completed. For example, in FIG. 3, the controller 130 may identify task targets and group the task targets based on the grouping criteria 312 until all task targets associated with the starter task 140 have been identified. Identifying all the task targets associated with the starter task 140 may cause multiple sub-tasks, e.g., the collection tasks 304 and the storage tasks 306 to be created. After the status 308, 310 of the collection tasks 304 and the storage tasks 306 have been marked as "completed", the status 302 associated with the starter task 140 may be updated to "completed".

Thus, when data associated with communications in an enterprise network is to be collected and stored, a starter task identifying the data to be collected is created. Based on the starter task, a controller identifies task targets from which to gather the data. The task targets that are identified are grouped together, based on grouping criteria to create collection tasks. After a collection task has been created, multiple collection agents in the network each create and send a bid to perform the collection task. The collection task is awarded to a collection agent with the winning bid (e.g., low cost bid). A storage task is created to store, in a central location, the data collected from performing the collection task. Multiple storage agents in the network each create and send a bid to perform the storage task. The storage task is awarded to a storage agent with the winning bid (e.g., low cost bid). After each collection task or storage task has been completed, the status of the collection task or storage task is changed to completed. After the sub-tasks (e.g., the collection tasks and the storage tasks) associated with the starter task have been completed, the status of the starter task is marked as completed.

FIG. 5 is a flowchart of a process 500 that includes generating and submitting a bid to perform a task according to some embodiments. The process 500 may be performed by one of the agents 114, 116 of FIG. 1 or by the bidding unit 202 of FIG. 2.

At 502, a determination is made that a task is available for bidding. For example, in FIG. 1, the agents 114, 116 may periodically (e.g., at a pre-determined interval) determine whether one of the tasks 132 has a status indicating that the task is available to be bid upon.

At 504, a configuration cost analysis may be performed. At 506, a historical cost analysis may be performed. At 508, a real-time costs analysis may be performed. At 510, a server status analysis may be performed. At 512, a bid to perform the task may be generated and submitted. For example, in FIG. 2, the real-time cost analyzer 206 may perform an analysis of the performance of completed tasks in approximately real-time and provide the analysis to the adaptive bid generator 214. The configuration analyzer 208 may collect configuration data to enable the adaptive bid generator 214 to set an initial bid for the task 216. The historical cost analyzer 210 may store a history of execution results (e.g., results of performing tasks) and analyze the historical results to provide information to the adaptive bid generator 214 to create the bid 204. The server status analyzer 212 may monitor, at a predetermined interval (e.g., every hour, every 4 hours, every 12 hours, or the like), server performance and other resource usage from potential target servers. For example, the server status analyzer 212 may monitor software and application constraints related to target tasks, such as SQL user connections, web connections, throttling status for data collection accounts, and the like. The adaptive bid generator 214 may use information from the analyzers 206, 208, 210, and 212 to forecast how long the agent 218 would likely take to perform the task 216 and submit the bid 204 for the agent 218 to perform the task 216.

At 514, a determination may be made whether the submitted bid is a winning bid. If a determination is made, at 514, that the submitted bid is not the winning bid, then the process proceeds to 502 to determine whether another task is available for bidding. If a determination is made, at 514, that the submitted bid is the winning bid, then an agent associated with the bid performs the task 516. Parameters associated with performing the task (e.g., time to complete the task, error messages generated, log messages generated, bandwidth utilization, and the like) may be determined and used when bidding on a next task. The process proceeds to 502 to determine whether another task is available for bidding. For example, the collection agents 114(1) to 114(N) may submit the bids 146(1) to 146(N), respectively, to perform the collection task 136. If the bid 146(N) is the winning bid, then the collection agent 114(N) may be awarded the collection task 136. The remaining agents 114 may resume determining whether there are additional collections tasks available for bidding and generate and submit bids for the additional collections tasks. The collection agent 114(N) may perform the collection task 136. The collection agent 114(N) may determine information associated with performing the collection task 136 and use the information when bidding on a next task. After the collection agent 114(N) has completed the collection task 136, the collection agent 114(N) may mark the status 142 as "completed" and resume determining whether any of the tasks 132 are available for bidding.

Thus, a bidding unit of an agent may take various factors into account to create a bid indicating the cost associated with the agent to perform a particular task. If the agent has a winning bid, the agent may execute the task, and the execution of the task by the agent may be monitored. The information gathered when monitoring the agent performing the task may be used to fine-tune the determination of subsequent bids.

Figure 6:
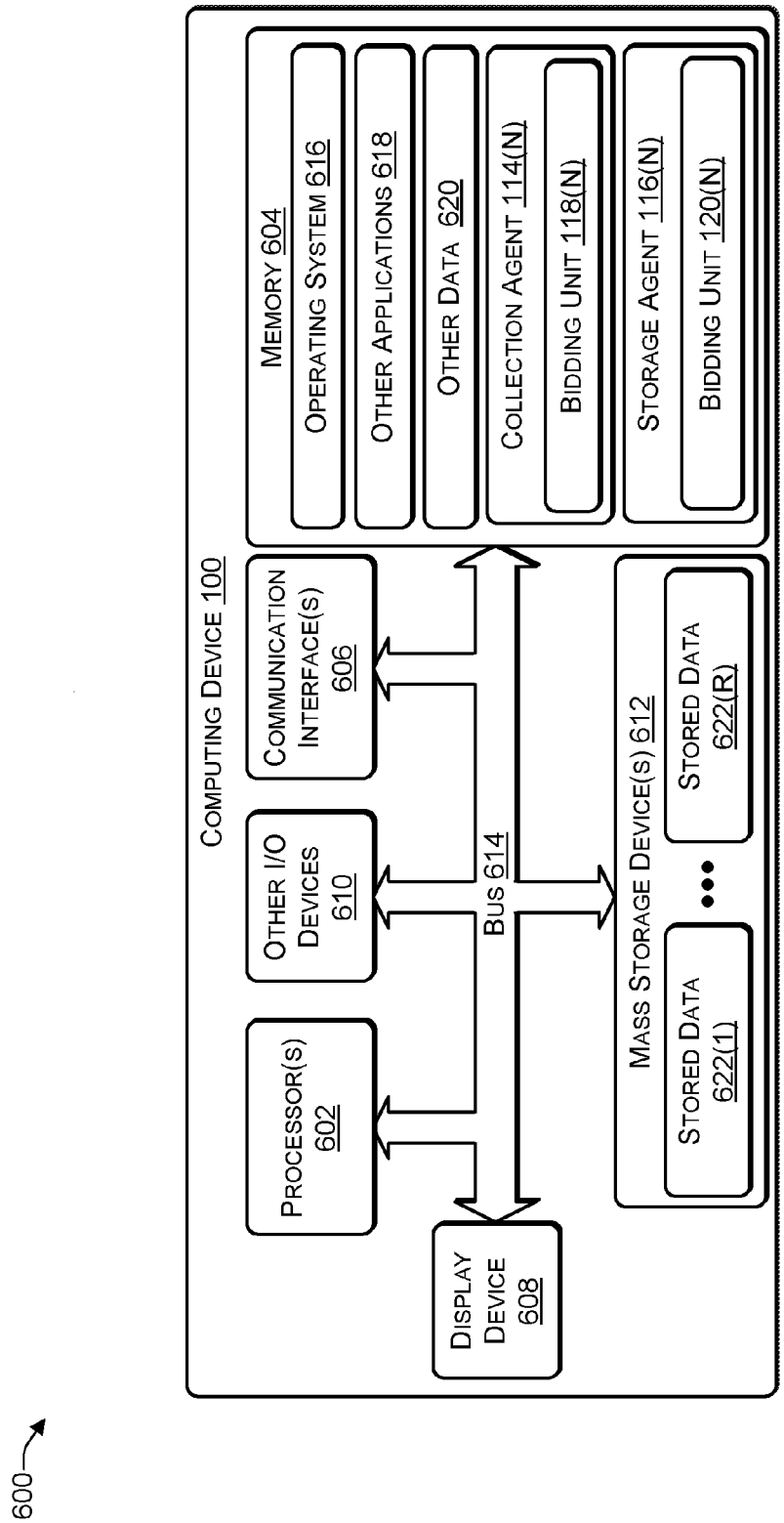
FIG. 6 illustrates an example configuration of a computing device that can be used to implement the systems and techniques described herein.

FIG. 6 illustrates an example configuration of a computing device 600 that can be used to implement the systems and techniques described herein, such as, for example, the servers 104, 106, 108, 110, the controller 130, or another component illustrated in FIG. 1. The computing device 600 may include one or more processors 602, a memory 604, communication interfaces 606, a display device 608, other input/output (I/O) devices 610, and one or more mass storage devices 612, configured to communicate with each other, such as via one or more system buses 614 or other suitable connection. While a single bus 614 is illustrated for ease of understanding, it should understood that the system bus 614 may include multiple buses, such as memory device buses, storage device buses, power buses, video signal buses, and the like.

The processors 602 are one or more hardware devices that may include a single processing unit or a number of processing units, all of which may include single or multiple computing units or multiple cores. The processors 602 may be implemented as one or more microprocessors, microcomputers, microcontrollers, digital signal processors, central processing units, graphics processing units, state machines, logic circuitries, and/or any hardware devices that manipulate signals based on operational instructions. Among other capabilities, the processor 602 may be configured to fetch and execute computer-readable instructions stored in the memory 604, mass storage devices 612, or other computer-readable media.

Memory 604 and mass storage devices 612 are examples of computer storage media (e.g., memory storage devices) for storing instructions that can be executed by the processor 602 to perform the various functions described herein. For example, memory 604 may include both volatile memory and non-volatile memory (e.g., random access memory (RAM), read-only memory (ROM), or the like) devices. Further, mass storage devices 612 may include hard disk drives, solid-state drives, removable media, including external and removable drives, memory cards, flash memory, floppy disks, optical disks (e.g., CD, DVD), a storage array, a network attached storage, a storage area network, or the like. Both memory 604 and mass storage devices 612 may be collectively referred to as memory or computer storage media herein, and may be a media capable of storing computer-readable, processor-executable program instructions as computer program code that can be executed by the processor 602 as a particular machine configured for carrying out the operations and functions described in the implementations herein.

The computing device 600 may also include one or more communication interfaces 606 for exchanging data via the network 118 with network elements 616. The communication interfaces 606 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet and the like. Communication interfaces 606 can also provide communication with external storage (not shown), such as in a storage array, network attached storage, storage area network, or the like. A display device 608, such as a monitor may be included in some implementations for displaying information and images to users. Other I/O devices 610 may be devices that receive various inputs from a user and provide various outputs to the user, and may include a keyboard, a remote controller, a mouse, a printer, audio input/output devices, and so forth.

The computer storage media, such as memory 604 and mass storage devices 612, may be used to store software and data. For example, the computer storage media may be used to store agents, such as the collection agent 114(N) and the storage agent 116(N), an operating system 616, other applications 618, and other data 620.

The storage agent 116(N) may store data gathered by the collection agent 114(N) when performing a task and store the data in the mass storage device 612 as stored data 622. For example, the stored data 622(1) may be associated with data collected when a first collection task was performed and the stored data 622(R) may be associated with data collected when an Rth collection task was performed.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    receiving a starter task to gather data associated with at least a portion of a communications system;
    determining a plurality of targets associated with the starter task;
    grouping, based on grouping criteria, a portion of the plurality of targets to create a collection task;
    receiving a plurality of bids from a plurality of collection agents, wherein each bid of the plurality of bids comprises a numerical representation of an amount of resources that the respective collection agent is expected to use to perform the collection task; and
    selecting a winning bid of the plurality of bids.

2. The method of claim 1, wherein the communications system comprises at least:
    an email system;
    a productivity suite that comprises a word processor application and a spreadsheet application;
    a videoconferencing system; and
    a collaboration suite.

3. The method of claim 1, wherein the plurality of targets include at least one of:
    mailboxes for email;
    tracking logs associated with email;
    logs associated with data loss prevention events;
    logs associated with particular types of events;
    server properties;
    domain controllers;
    databases storing information associated with video conferencing activities;
    configuration and user policies associated with a video conferencing system;
    a call data record (CDR) database associated with a collaboration suite; or
    user subscriptions associated with a productivity suite.

4. The method of claim 1, wherein the grouping criteria includes at least one of:
    a number of messages in a target mailbox;
    a number of events in an activity log database associated with a target;
    whether more than one target is located on a same server;
    an amount of effort associated with extracting data from the target; or
    a number of application programming interface (API) calls to extract data from the target.

5. The method of claim 1, wherein selecting the winning bid of the plurality of bids comprises:
    determining a lowest cost bid of the plurality of bids; and
    selecting the lowest cost bid as the winning bid.

6. The method of claim 1, wherein selecting the winning bid of the plurality of bids comprises:
    determining a low cost bid of the plurality of bids, wherein the low cost bid is:
        lower than at least ninety percent of the plurality of bids; and
        associated with a first collection agent of the plurality of collection agents; and
    selecting the low cost bid as the winning bid based at least in part on a length of time from when the first collection agent performed a previous task.

7. The method of claim 1, wherein each bid of the plurality of bids is created based on at least one of:
    an analysis of historical costs;
    an analysis of a status of one or more servers associated with the collection task;
    an analysis of a configuration of the portion of the plurality of targets associated with the collection task; and
    a cost analysis of a recently performed task.

8. A computing device comprising:
    one or more processors;
    one or more memory storage devices storing instructions that are executable by the one or more processors to perform operations comprising:
        creating a starter task to gather data associated with at least a portion of a communications system;
        determining a plurality of targets associated with the starter task;
        grouping, based on grouping criteria, a portion of the plurality of targets to create a collection task;
        receiving a plurality of bids from a plurality of collection agents, wherein each bid of the plurality of bids comprises a numerical representation of an amount of resources that the respective collection agent is expected to use to perform the collection task by a particular collection agent of the plurality of collection agents; and
        selecting a winning bid of the plurality of bids to perform the collection task.

9. The computing device of claim 8, wherein the operations further comprise:

creating a storage task to transfer gathered data collected as a result of performing the collection task to a central storage facility.

10. The computing device of claim 9, wherein the operations further comprise:
receiving a plurality of storage bids from a plurality of storage agents, wherein each storage bid of the plurality of storage bids comprises a storage cost estimate to perform the storage task by a particular storage agent of the plurality of storage agents; and
selecting a winning storage bid of the plurality of storage bids to perform the storage task.

11. The computing device of claim 9, wherein the operations further comprise:
updating a status of the storage task completed after the collection task has been performed.

12. The computing device of claim 8, wherein the operations further comprise:
updating a status of the collection task completed after the collection task has been performed.

13. The computing device of claim 8, wherein the operations further comprise:
grouping, based on the grouping criteria, a second portion of the plurality of targets to create a second collection task;
receiving a plurality of additional bids from the plurality of collection agents to perform the second collection task; and
selecting an additional winning bid of the plurality of additional bids to perform the second collection task.

14. One or more non-transitory computer-readable media storing instructions that are executable by one or more processors to perform operations comprising:
receiving a starter task to gather data associated with at least a portion of a communications system;
determining a plurality of targets associated with the starter task;
grouping, based on grouping criteria, a portion of the plurality of targets to create a collection task;
receiving a plurality of bids from a plurality of collection agents, wherein each bid of the plurality of bids comprises a numerical representation of an amount of resources that the respective collection agent is expected to use to perform the collection task; and
selecting a winning bid of the plurality of bids, wherein the winning bid is associated with a particular collection agent of the plurality of collection agents.

15. The one or more non-transitory computer-readable media of claim 14, wherein a particular bid of the plurality of bids comprises a numerical estimate of an amount of time for a particular agent to perform the collection task.

16. The one or more non-transitory computer-readable media of claim 14, wherein a particular bid of the plurality of bids comprises a numerical estimate of an amount of resources for a particular agent to perform the collection task, wherein the resources include one or more of central processing unit (CPU) cycles, memory usage, or bandwidth usage.

17. The one or more non-transitory computer-readable media of claim 14, wherein the grouping criteria includes at least one of:
a number of messages in a target mailbox;
a number of events in an activity log database associated with a target;
whether more than one target is located on a same server;
an amount of effort associated with extracting data from the target; or
a number of application programming interface (API) calls to extract data from the target.

18. The one or more non-transitory computer-readable media of claim 14, the operations further comprising:
collecting performance data associated with the particular collection agent performing the collection task; and
creating a second bid for a second collection task based at least in part on the performance data.

19. The one or more non-transitory computer-readable media of claim 14, wherein selecting the winning bid of the plurality of bids comprises:
determining a low cost bid of the plurality of bids, wherein the low cost bid is lower than at least ninety percent of the plurality of bids; and
selecting the low cost bid as the winning bid based at least in part on a length of time from when the particular collection agent performed a previous task.

20. The one or more non-transitory computer-readable media of claim 14, wherein each bid of the plurality of bids is created based on at least one of:
an analysis of historical costs;
an analysis of a status of one or more servers associated with the collection task;
an analysis of a configuration of the portion of the plurality of targets associated with the collection task; and
a cost analysis of a recently performed task.

* * * * *